(12) United States Patent
Fried

(10) Patent No.: US 9,365,451 B2
(45) Date of Patent: *Jun. 14, 2016

(54) CEMENT ADDITIVES PRODUCED BY COMBUSTION OF COAL WITH CLAY AND SLAG

(71) Applicant: Ash Improvement Technology Inc., New York, NY (US)

(72) Inventor: Wayne Fried, Maspeth, NY (US)

(73) Assignee: Ash Improvement Technology Inc., New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/880,996

(22) Filed: Oct. 12, 2015

(65) Prior Publication Data
US 2016/0031758 A1    Feb. 4, 2016

Related U.S. Application Data

(63) Continuation-in-part of application No. 13/741,071, filed on Jan. 14, 2013, now abandoned, which is a continuation-in-part of application No. 12/889,100, filed on Sep. 23, 2010, now Pat. No. 8,741,054.

(60) Provisional application No. 61/245,594, filed on Sep. 24, 2009, provisional application No. 62/062,442, filed on Oct. 10, 2014.

(51) Int. Cl.
- *C04B 18/04* (2006.01)
- *C04B 18/08* (2006.01)
- *C04B 14/10* (2006.01)
- *C04B 14/00* (2006.01)

(52) U.S. Cl.
CPC ..................................... *C04B 14/00* (2013.01)

(58) Field of Classification Search
CPC .......... C04B 18/04; C04B 18/08; C04B 14/10
See application file for complete search history.

(56) References Cited

U.S. PATENT DOCUMENTS

| 3,437,329 A | 4/1969 | Ostberg et al. |
| 3,909,283 A | 9/1975 | Warnke |
| 4,026,717 A | 5/1977 | Harris et al. |

(Continued)

FOREIGN PATENT DOCUMENTS

| DE | 42 10 224 C1 | 5/1993 |
| EP | 0 022 318 A1 | 1/1981 |

(Continued)

OTHER PUBLICATIONS

Kraisha et al., "Coal Combustion and Limestone Calcination in a Suspension Reactor", Chemical Engineering Science, 1992, pp. 993-1006, vol. 47, No. 5.

(Continued)

*Primary Examiner* — Paul Marcantoni
(74) *Attorney, Agent, or Firm* — Alan G. Towner, Esq.; Pietragallo Gordon Alfano Bosick & Raspanti, LLP

(57) ABSTRACT

Coal is combusted in the presence of a clay additive and a slag additive to produce a combustion product that is useful as a pozzolanic additive for cement. The combustion process may be performed in a coal-fired boiler of an electrical power generation plant, resulting in improved operational efficiency and controlled emissions.

20 Claims, 11 Drawing Sheets

(56) References Cited

U.S. PATENT DOCUMENTS

| | | |
|---|---|---|
| 4,081,285 A | 3/1978 | Pennell |
| 4,174,974 A | 11/1979 | Fondriest |
| 4,238,237 A | 12/1980 | Jarrett et al. |
| 4,260,421 A | 4/1981 | Brown et al. |
| 4,318,744 A | 3/1982 | Dodson |
| 4,396,432 A | 8/1983 | Rostoker |
| 4,508,573 A | 4/1985 | Harris |
| 4,600,438 A | 7/1986 | Harris |
| 5,078,593 A | 1/1992 | Schreiber, Jr. et al. |
| 5,160,539 A | 11/1992 | Cochran |
| 5,336,317 A | 8/1994 | Beisswenger et al. |
| 5,849,075 A | 12/1998 | Hopkins et al. |
| 5,968,254 A | 10/1999 | Dodgen et al. |
| 6,038,987 A | 3/2000 | Koshinski |
| 6,250,235 B1 | 6/2001 | Oehr et al. |
| 6,395,054 B1 | 5/2002 | Edlinger |
| 6,468,345 B1 | 10/2002 | Zhu et al. |
| 6,749,681 B1 | 6/2004 | Burdis et al. |
| 6,764,544 B2 | 7/2004 | Oates et al. |
| 6,869,473 B2 | 3/2005 | Comrie |
| 7,037,368 B2 | 5/2006 | Hoffis |
| 7,141,112 B2 | 11/2006 | Comrie |
| 7,294,193 B2 | 11/2007 | Comrie |
| 7,670,139 B2 | 3/2010 | Hance et al. |
| 8,110,039 B2 | 2/2012 | Hunt |
| 8,133,317 B2 | 3/2012 | Hirao et al. |
| 8,206,504 B2 | 6/2012 | Bethani |
| 8,293,005 B2 | 10/2012 | Barbour |
| 8,741,054 B2 | 6/2014 | Fried |
| 2002/0017224 A1 | 2/2002 | Horton |
| 2003/0154887 A1 | 8/2003 | Oates et al. |
| 2003/0233962 A1 | 12/2003 | Dongell |
| 2004/0035330 A1 | 2/2004 | Oates et al. |
| 2005/0066860 A1 | 3/2005 | Logan et al. |
| 2006/0032408 A1 | 2/2006 | Strabala |
| 2006/0034743 A1 | 2/2006 | Radway et al. |
| 2007/0184394 A1 | 8/2007 | Comrie |
| 2007/0224109 A1 | 9/2007 | Chaifetz et al. |
| 2009/0151604 A1 | 6/2009 | Hirao et al. |
| 2011/0067601 A1 | 3/2011 | Fried |
| 2013/0125792 A1 | 5/2013 | Fried et al. |
| 2013/0125799 A1 | 5/2013 | Fried et al. |
| 2015/0122161 A1 | 5/2015 | Landon et al. |
| 2015/0192295 A1 | 7/2015 | Ravagnani et al. |

FOREIGN PATENT DOCUMENTS

| | | |
|---|---|---|
| EP | 2891843 A1 | 7/2015 |
| JP | 3 059311 | 3/1996 |
| KR | 950 003 212 | 2/1995 |
| WO | 2008012438 A2 | 1/2008 |
| WO | 2011103371 A2 | 8/2011 |
| WO | 2013093097 A1 | 6/2013 |

OTHER PUBLICATIONS

Tokyay, "Strength prediction of fly ash concretes by accelerated testing", Cement and Concrete Research, 1999, pp. 1737-1741, vol. 29.

Reda Taha et al., "The Use of Pozzolans to Improve Bond and Bond Strength", Proceedings of the 9th Canadian Masonry Symposium, 2001.

Ishom et al, "Behaviors of Ashes in Pressurized Fluidized Bed Combustion of Coal", Reprints of Symposia—American Chemical Society, Division of Fuel, Jan. 1, 2002, pp. 811-813, vol. 47, No. 2.

CEMENT ADDITIVES PRODUCED BY COMBUSTION OF COAL WITH CLAY AND SLAG

CROSS-REFERENCE TO RELATED APPLICATIONS

This application is a continuation-in-part of U.S. patent application Ser. No. 13/741,071 filed Jan. 14, 2013, which is a continuation-in-part of U.S. patent application Ser. No. 12/889,100 filed Sep. 23, 2010, now U.S. Pat. No. 8,741,054 issued Jun. 3, 2014, which claims the benefit of U.S. Provisional Patent Application Ser. No. 61/245,594 filed Sep. 24, 2009. This application also claims the benefit of U.S. Provisional Patent Application Ser. No. 62/062,442 filed Oct. 10, 2014. All of these applications are incorporated herein by reference.

FIELD OF THE INVENTION

The present invention relates to the production of cement additives by the addition of clay and slag materials during coal combustion processes.

BACKGROUND INFORMATION

U.S. Pat. Nos. 8,741,054 and 8,961,684, and Published U.S. Application Nos. US2013/0125799 and US2013/0125791, which are incorporated herein by reference, disclose coal combustion processes, such as those used in coal-fired electrical power generation plants, in which additives are introduced during the process to produce combustion products having beneficial properties when they are used as additives to cementitious materials.

SUMMARY OF THE INVENTION

An aspect of the present invention is to provide a cementitious material comprising cement, and a pozzolanic cement additive comprising coal combusted in the presence of a clay additive and a slag additive, wherein the combined weight of the clay additive and the slag additive is at least 8 weight percent of the weight of the coal.

Another aspect of the present invention is to provide a pozzolanic strength enhancing material for addition to cement comprising a combustion product of coal combusted in the presence of a clay additive and a slag additive, wherein the combined weight of the clay additive and the slag additive is at least 8 weight percent of the weight of the coal.

A further aspect of the present invention is to provide a method of making a pozzolanic cement additive material comprising combusting coal in the presence of a clay additive and a slag additive to thereby produce the pozzolanic cement additive material, wherein the combined weight of the clay additive and the slag additive is at least 8 weight percent of the weight of the coal.

These and other aspects of the present invention will be more apparent from the following description.

DETAILED DESCRIPTION

In accordance with the present invention, clay and slag additives are added to coal combustion processes to produce useful cement additive materials. In addition to producing strength-enhancing materials for use in cement, combined additions of clay such as kaolin, talc, attapulgite, etc. and slag such as metal slags to coal-fired combustors increase their efficiency and thermal heat transfer. Furthermore, these combined additives have been shown to reduce the emission of heavy metals, such as mercury, while also deslagging the boiler components. The clay additive materials may comprise kaolin, montmorillonite/smectite, illite and chlorite groups and the like. The slag additive materials may comprise metallurgical slags such as ferrous slags, non-ferrous slags, aluminum slag, copper slag, recycled ground granulated blast furnace slag, and the like. For example, the slag additive may comprise stainless steel slag. The resultant material byproduct of this combustion process becomes a useful additive for cementitious materials, with enhanced pozzolanic reactivity, water reducing capabilities, and other benefits, such as alkali-silica reaction inhibition.

Figure 1:
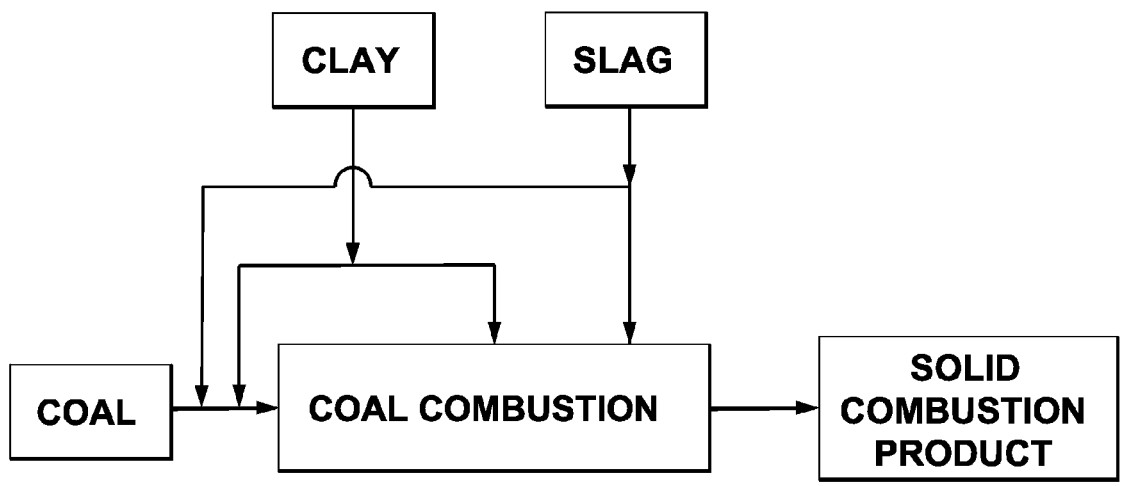
FIG. 1 schematically illustrates methods of adding clay and slag separately to coal combustion processes to produce a combustion product in accordance with an embodiment of the present invention.
Figure 2:
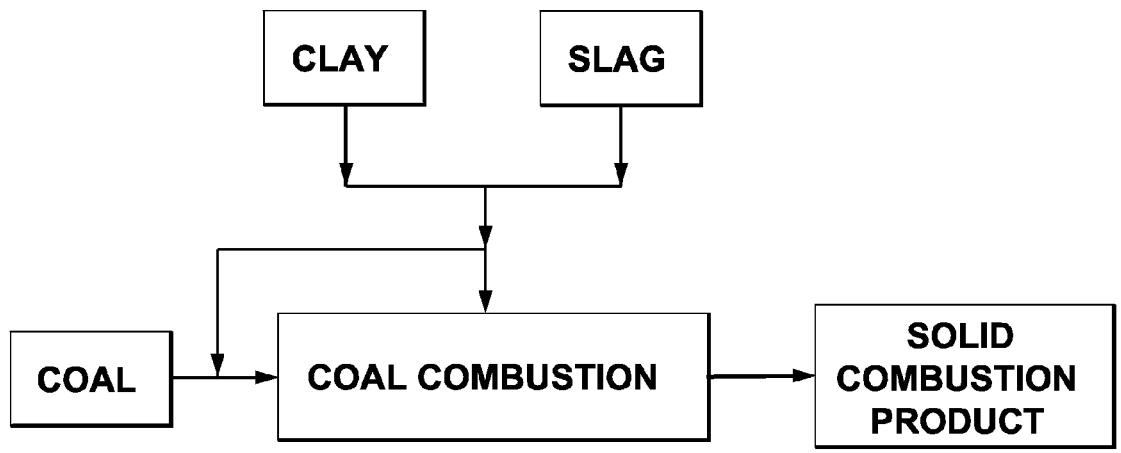
FIG. 2 schematically illustrates methods of adding clay and slag together to coal combustion processes to produce a combustion product in accordance with an embodiment of the present invention.

FIGS. 1 and 2 schematically illustrate processes for producing combustion products that may be used as pozzolanic materials for use in cement in accordance with embodiments of the present invention. The clay and slag additions are introduced during the coal combustion processes. In the embodiments of FIG. 1, the clay and slag additives are introduced separately during the coal combustion process. In the embodiments of FIG. 2, the clay and slag additives are introduced together into the coal combustion process.

As shown in FIG. 1, the clay additive may be added directly into the coal combustion zone, such as the burner of a coal-fired electric power generating plant. Alternatively, the clay additive may be mixed with the coal prior to their introduction into the coal combustion zone. As also shown in FIG. 1, the slag additive may be added directly into the coal combustion zone. Alternatively, the slag additive may be mixed with the coal prior to their introduction into the coal combustion zone. When the clay and/or slag are introduced into the coal combustion zone, they may be introduced in any suitable manner, for example, by a direct feed line into the burner. In certain embodiments, the clay and/or slag additives are introduced into a recirculation loop that feeds back into the burner.

The embodiments shown in FIG. 2 are similar to those of FIG. 1, with the exception that the clay additive and the slag additive are mixed or otherwise combined together prior to their introduction into the coal combustion zone or their pre-mixture with the coal prior to introduction into the coal combustion zone. In certain embodiments, the clay additive and slag additive are introduced into a recirculation loop that feeds back into the burner.

Thus, in accordance with embodiments of the present invention as illustrated in FIGS. 1 and 2, clay and slag additives are introduced during a coal combustion process, such as the combustion zone of a coal-fired power plant. The clay and slag additives may be introduced into the burner, upstream from the burner and/or downstream from the burner in a recirculation loop back into the burner. When introduced upstream, the clay and slag additives may be introduced separately into a coal stream, or may be pre-mixed together before their addition to the coal stream. When introduced directly into the combustion chamber, the clay and slag may be introduced separately, pre-mixed and introduced together and/or pre-mixed with the coal.

Any suitable type or grade of coal may be used in accordance with the present invention. In certain embodiments, the coal that is introduced into the burner may be low-grade coal, e.g., comprising waste or a by-product such as coal washings from coal processing operations. Such coal washings are considered waste material that may be stored in large outdoor heaps or piles, which can result in unwanted water contamination and runoff in the surrounding areas, e.g., the water may have a pH as low as 1. Certain types of power plants burn such coal washings as waste materials and may therefore be classified as waste treatment plants rather than conventional coal-fired power plants. All of these types of facilities are considered to be within the scope of the present invention, as well as other coal combustion facilities and processes.

Examples of clay additives include the kaolin, montmorillonite/smectite, illite and chlorite groups. The kaolin group includes kaolinite, dickite and nacrite, and has a formula of $Al_2Si_2O_5(OH)_4$. For example, kaolin may include about 46 weight percent silica and about 28 weight percent alumina, with minor amounts of titanium (e.g., 1.5 weight percent), iron (e.g., 0.62 weight percent), calcium (e.g., 0.19 weight percent), magnesium (e.g., 0.14 weight percent), carbon (e.g., 0.01 weight percent) and sulfur trioxide (e.g., 0.02 weight percent), along with minor amounts of moisture. The different minerals are polymorphs, i.e., they have the same chemistry but different structures. The general structure of the kaolinite group is composed of silicate sheets $(Si_2O_5)$ bonded to aluminum oxide/hydroxide layers $(Al_2(OH)_4)$ known as gibbsite layers. The silicate and gibbsite layers are tightly bonded together with only weak bonding existing between the s-g paired layers.

The montmorillonite/smectite group comprises several minerals including pyrophyllite, talc, vermiculite, sauconite, saponite, nontronite and monmorillonite, which differ mostly in chemical content. The general formula is (Ca, Na, H)(Al, Mg, Fe, $Zn)_2(Si, Al)_4O_{10}(OH)_2$-$xH_2O$, where x represents the variable amount of water that members of this group may contain. The formula for talc is $Mg_3Si_4O_{10}(OH)_2$. The gibbsite layers of the kaolinite group can be replaced in this group by a similar layer that is analogous to the oxide brucite (Mg2 $(OH)_4)$. The structure of this group is composed of silicate layers sandwiching a gibbsite (or brucite) layer in between, in an s-g-s stacking sequence. The variable amounts of water molecules may lie between the s-g-s sandwiches.

The illite group is basically a hydrated microscopic muscovite. The mineral illite is the common mineral represented, however, it is a significant rock forming mineral being a main component of shales and other argillaceous rocks. The general formula is (K, $H)Al_2(Si, Al)_4O_{10}(OH)_2$-$xH_2O$, where x represents the variable amount of water that this group may contain. The structure of this group is similar to the montmorillonite group with silicate layers sandwiching a gibbsite-like layer in between, in an s-g-s stacking sequence. The variable amounts of water molecules may lie between the s-g-s sandwiches as well as the potassium ions.

The chlorite group has a general formula of $X_{4-6}Y_4O_{10}$ $(OH, O)_8$, where the X represents one or more of aluminum, iron, lithium, magnesium, manganese, nickel, zinc or rarely chromium, and the Y represents either aluminum, silicon, boron or iron but mostly aluminum and silicon.

In certain embodiments, the clay additive may include particle size fractions that are not typically desirable for certain types of industrial applications such as use in paper or cosmetic products. For example, the clay may have a smaller and/or larger average particle size than the clay typically used in various industries. As a particular example, when kaolin is mined, approximately one-third may be sized appropriately for use in the paper or cosmetic industries, while the remaining approximately two-thirds of the mined kaolin may include ultrafine particles and/or coarse particles that may remain unused. Such unused fractions may be dumped into storage areas such as pits, abandoned mines, etc. In accordance with embodiments of the present invention, such discarded kaolin is useful as the kaolin additive component in the coal combustion process.

In accordance with another embodiment of the invention, recycled clays from various sources such as waste paper may be recovered and used as the clay additive in accordance with the present invention. In certain instances, such as waste paper containing clay, the entire waste product may be combusted in the burner, thereby providing a source of clay as well as an additional combustible fuel for the combustion process.

Examples of slag additives include metallurgical slags such as ferrous slag, stainless steel slag, non-ferrous slag, aluminum slag, copper slag, recycled ground granulated blast furnace slag, and the like.

The total combined weight of the clay additive and the slag additive is typically from 8 to 60 percent of the weight of the coal, for example, from 10 to 40 percent. The clay additives may typically comprise from 1 or 2 to 50 percent of the weight of the coal, for example, from 3 to 30 percent. The slag additives may typically comprise from 1 or 2 to 50 percent of the weight of the coal, for example, from 3 to 30 percent.

Other optional additives include limestone, waste concrete such as recycled Portland cement concrete, shale, recycled crushed glass, recycled crushed aggregate fines, silica fume, cement kiln dust, lime kiln dust, weathered clinker, clinker, granite kiln dust, zeolites, limestone quarry dust, red mud, fine ground mine tailings, oil shale fines, bottom ash, dry stored fly ash, landfilled fly ash, ponded flyash, lithium-containing ores and other waste or low-cost materials containing calcium oxide, silicon dioxide and/or aluminum oxide.

In certain embodiments, limestone may be injected along with the clay and slag additives during the coal combustion process. The amount of limestone may be selected in order to control emissions such as $SO_X$ while producing a combustion product with desirable properties when added to cement. For example, the amount of limestone may range from zero to 5 weight percent based on the weight of the coal, or the limestone may range from 0.5 to 4 weight percent, or from 1 to 3 weight percent, based on the weight of the coal. When limestone, clay additives and slag additives are injected during the coal combustion process, their combined weight is typically at least 8 weight percent based on the total weight of the coal, limestone, clay and slag, for example, their combined weight may be at least 10 weight percent based on the total weight of the coal, limestone, clay and slag.

The combustion products of the present invention may be added to various types of cement, including Portland cement. For example, the combustion products may comprise greater than 10 weight percent of the cementitious material, typically greater than 25 weight percent. In certain embodiments, the additive comprises 30 to 95 weight percent of the cementitious material.

One embodiment of the present invention uses the coal fired boiler of an electric power plant as a chemical processing vessel to produce the combustion products, in addition to its normal function of generating steam for electrical energy. This approach may be taken without reducing the efficiency of the boiler's output while, at the same time, producing a commodity with a controlled specification and a higher commercial value to the construction market. The resulting ash product is designed to have beneficial pozzolanic properties for use in conjunction with Portland cement, or with different chemical modifications also producing a pozzolan that could also be a direct substitution for Portland cement. In both cases, advantages may be both economic and environmental. Landfill needs are reduced, and cost savings result by avoiding transportation and land filling of the ash. In addition, to the extent that the ash replaces Portland cement, it reduces the amount of carbon dioxide and other toxic emissions generated by the manufacture of Portland cement.

The following examples are intended to illustrate various aspects of the present invention, and are not intended to limit the scope of the invention.

EXAMPLES

Tests were performed in a conventional fluidized bed coal fired boiler of an electrical power generation plant. Combined injections of clay and slag were made to the coal combustion zone by adding the clay and slag into the recirculation loop of the fluidized bed boiler. The clay additive comprised kaolin, while the slag additive comprised stainless steel slag. The coal was a low grade coal, i.e., waste coal. When the kaolin and slag were added, the amount of limestone added to the coal fired burner was significantly decreased from the conventional amounts of limestone typically used to control emissions from the boiler. The results of the tests are graphically shown in FIGS. 3-9.

Figure 3:
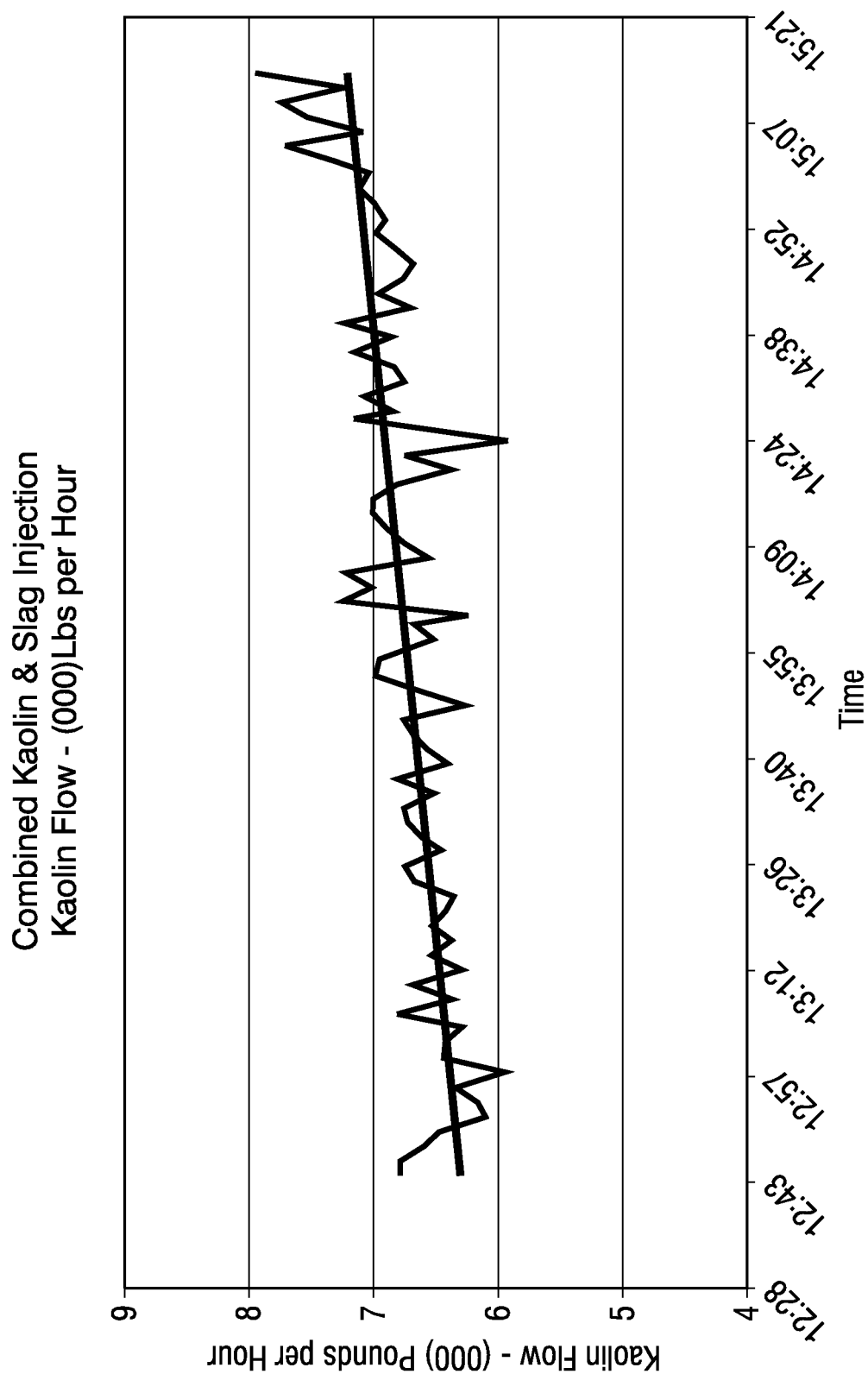
FIG. 3 is a graph of kaolin flow versus time for combined injections of kaolin and slag to a coal combustion process.

FIG. 3 is a graph of kaolin flow versus time for combined injections of kaolin and slag to the coal combustion zone. As shown in FIG. 3, during the combined kaolin and slag injection, the rate of kaolin injection was within a range of from about 6,000-8,000 pounds per hour. In addition to the data plot shown in FIG. 3, a straight line has been superimposed thereon, as well as in subsequent figures, to show the general increase in flow during the injection period.

Figure 4:
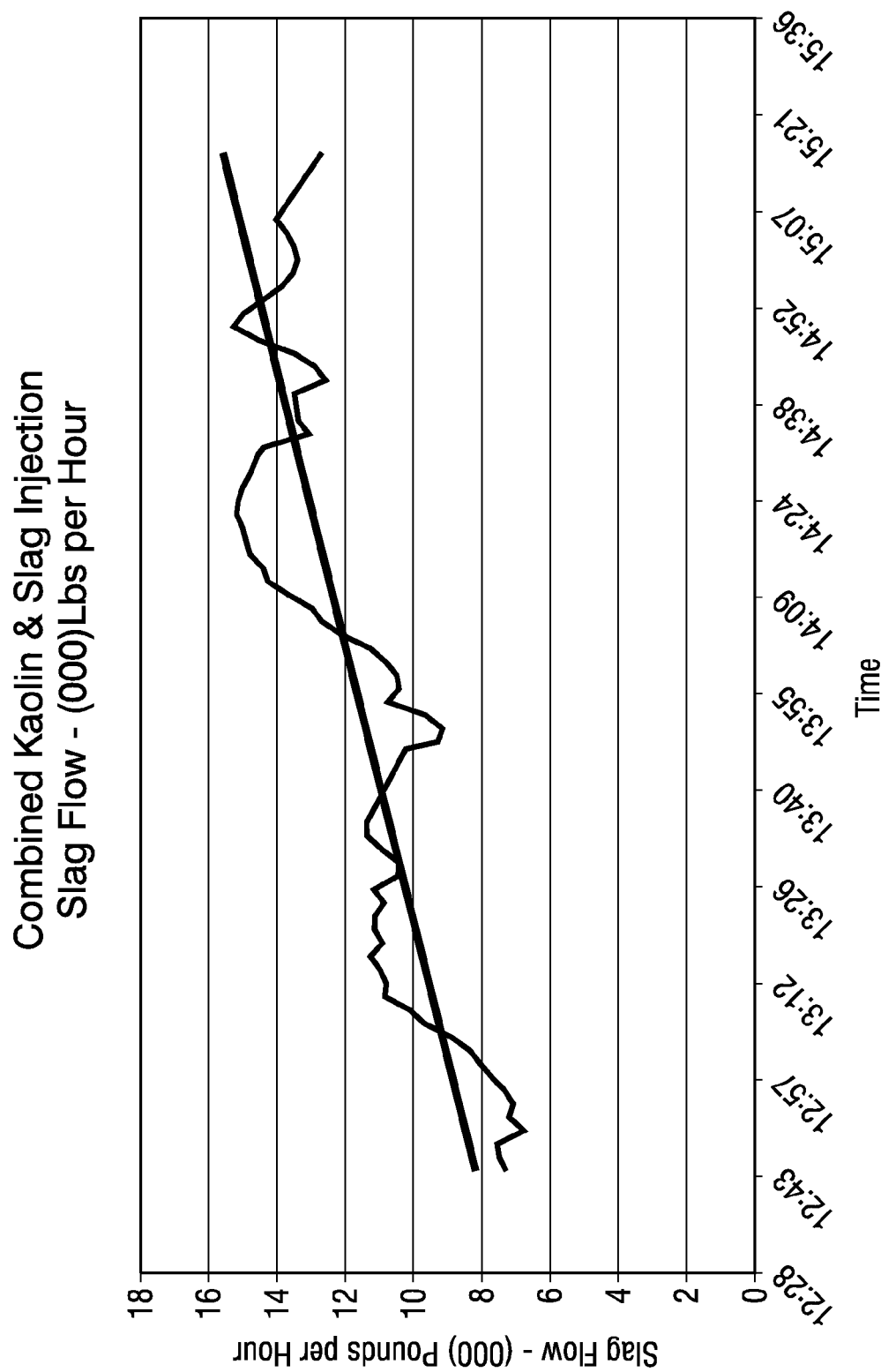
FIG. 4 is a graph of slag flow versus time for combined injections of kaolin and slag to a coal combustion process.

FIG. 4 is a graph of slag flow versus time for combined injections of kaolin and slag to the coal combustion zone. As shown in FIG. 4, during the combined injection of kaolin and slag, the flow of slag generally ranged between 7,000 and 15,000 pounds per hour. A straight line is superimposed on the actual flow plot to illustrate the generally increasing flow rate during the test period.

Figure 5:
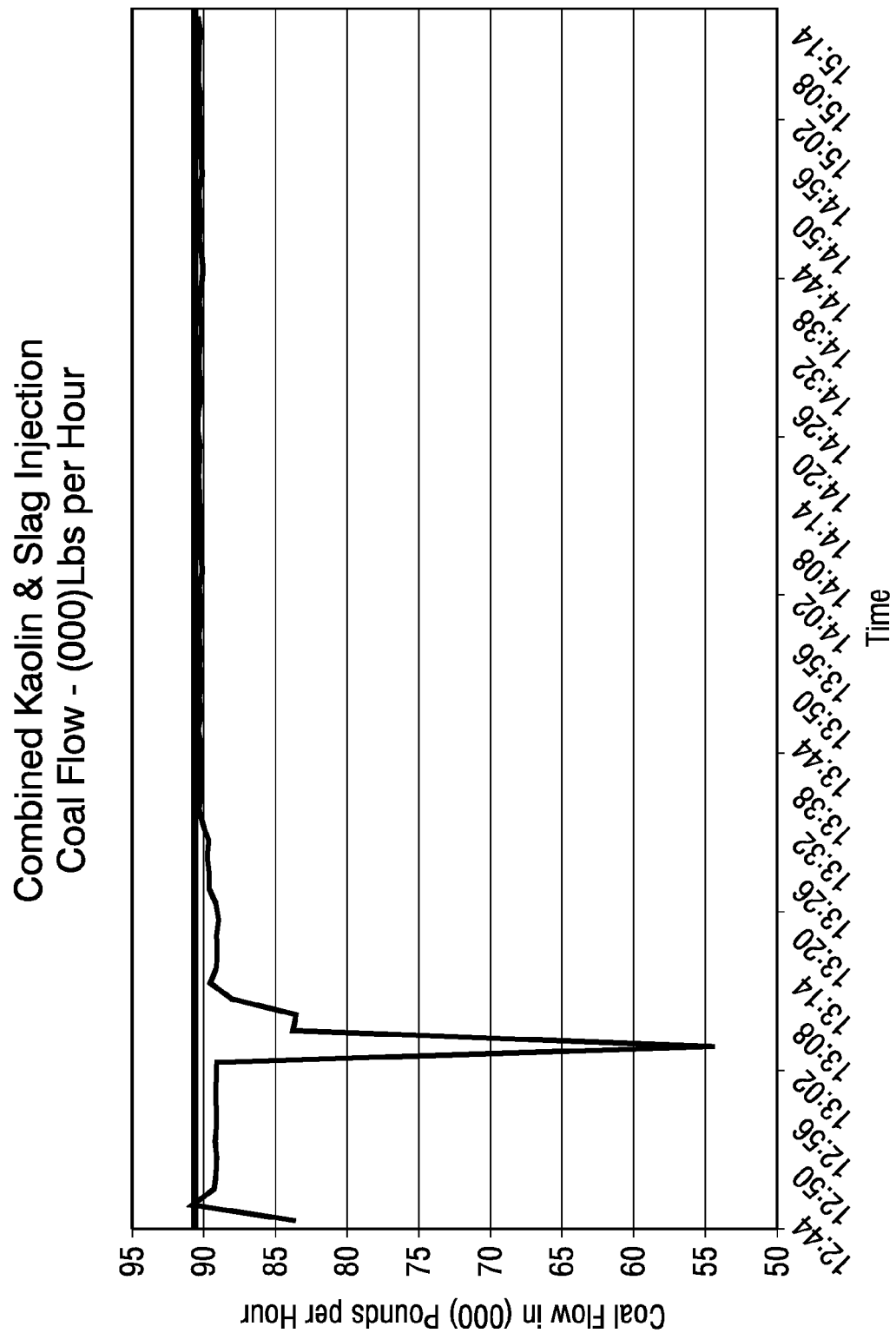
FIG. 5 is a graph of coal flow versus time during a process of combined injections of kaolin and slag during a coal combustion process.

FIG. 5 is a graph of coal flow versus time during a process of combined injections of kaolin and slag during the coal combustion zone. As shown in FIG. 5, during the combined injection of kaolin and slag, the coal flow was maintained at a substantially constant flow rate of 90,000 pounds per hour. Although a sharp dip in the coal flow rate is shown during a short portion of the test period, the sharp dip may be due to a measurement anomaly, and the overall coal flow rate was maintained substantially constant, as shown by the straight line in FIG. 5.

Figure 6:
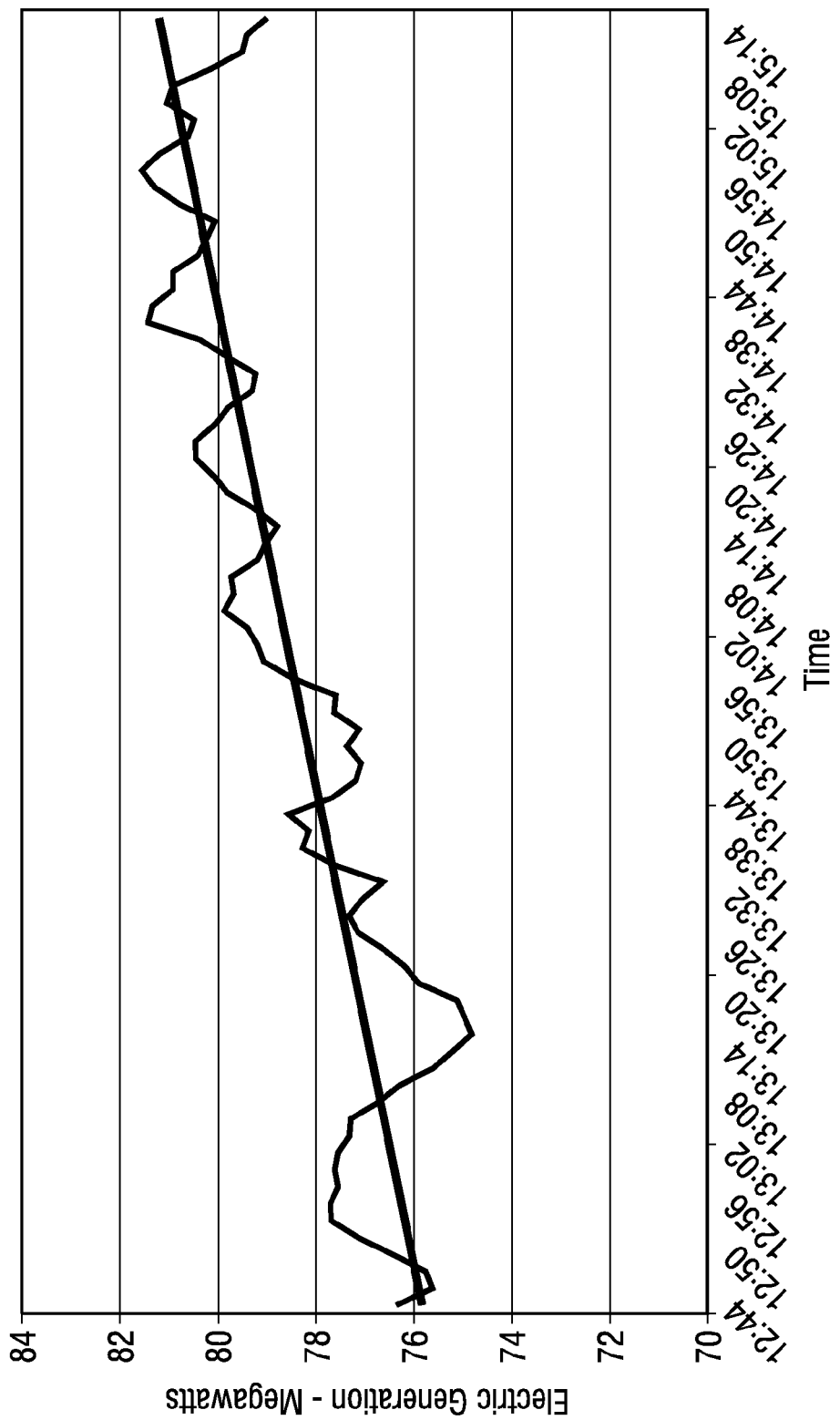
FIG. 6 is a graph of electric power generation versus time for combined injections of kaolin and slag into a coal combustion process.

FIG. 6 is a graph of electric power generation versus time for combined injections of kaolin and slag into the coal combustion zone. As shown in FIG. 6, during the combined injection of kaolin and slag, the electric power generation from the power plant was within the general range of from 75 to 81 megawatts.

Figure 7:
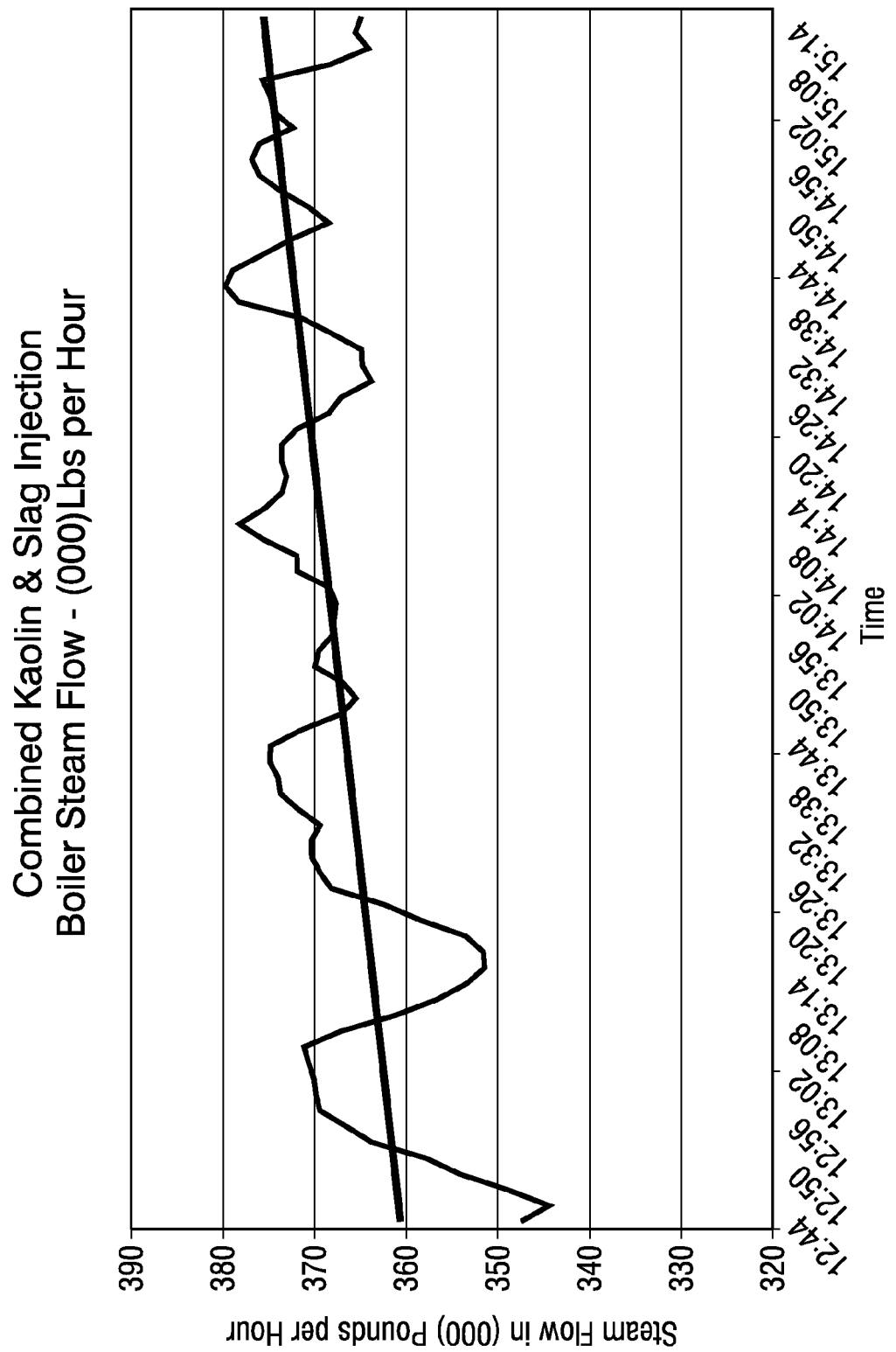
FIG. 7 is a graph of boiler steam flow versus time during combined injections of kaolin and slag in a coal combustion process.

FIG. 7 is a graph of boiler steam flow versus time during combined injections of kaolin and slag in the coal combustion zone. As shown in FIG. 7, the steam flow generated by the coal fired boiler during the combined injection of kaolin and slag ranged generally from 350,000 to 380,000 pounds per hour.

Figure 8:
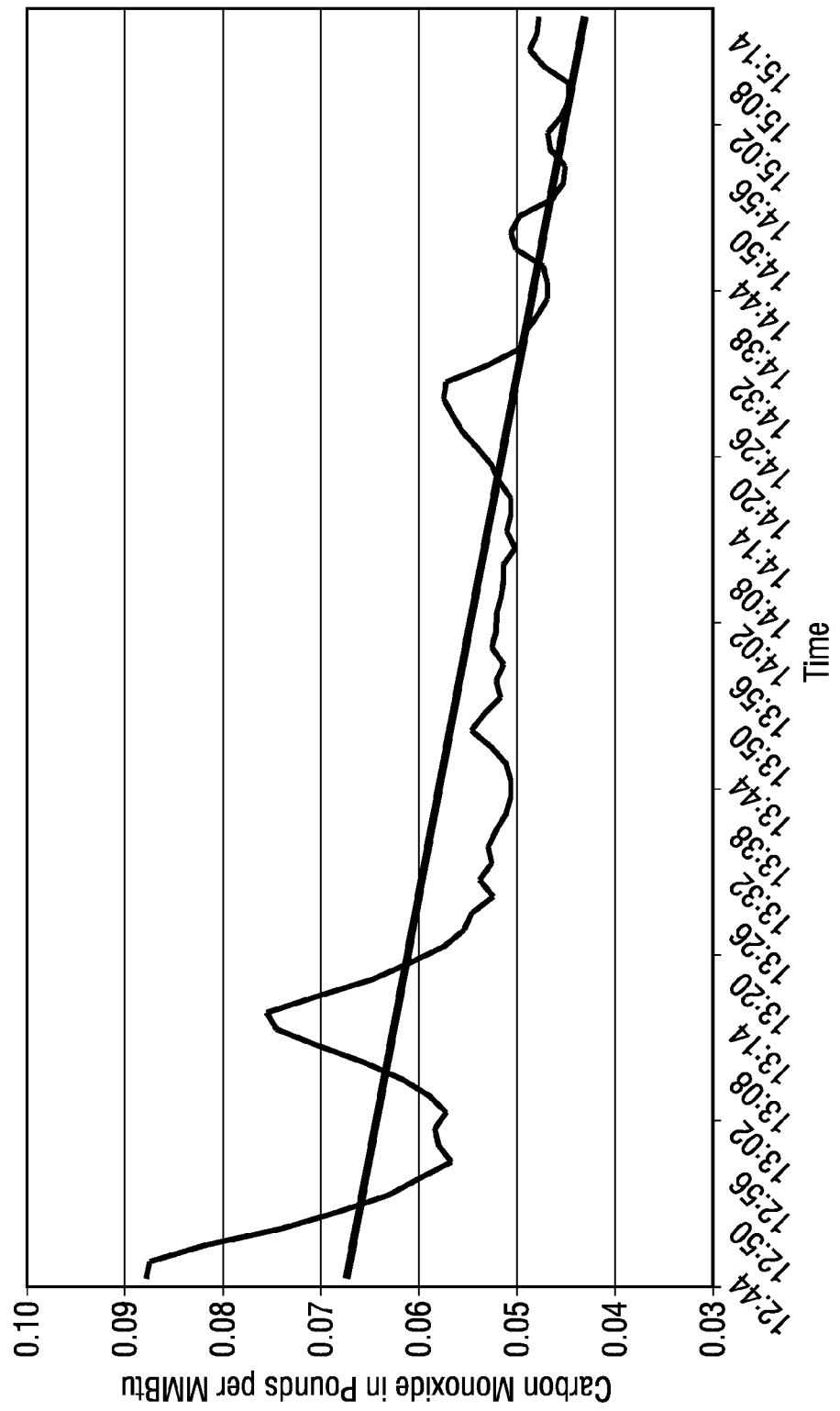
FIG. 8 is a graph of carbon monoxide versus time during combined injection of kaolin and slag into a coal combustion process.

FIG. 8 is a graph of carbon monoxide versus time during combined injection of kaolin and slag into the coal combustion zone. As shown in FIG. 8, during the combined injection of kaolin and slag, carbon monoxide emissions range from about 0.05 to 0.08 pounds per MMBtu, with a significant drop during the injection process.

Figure 9:
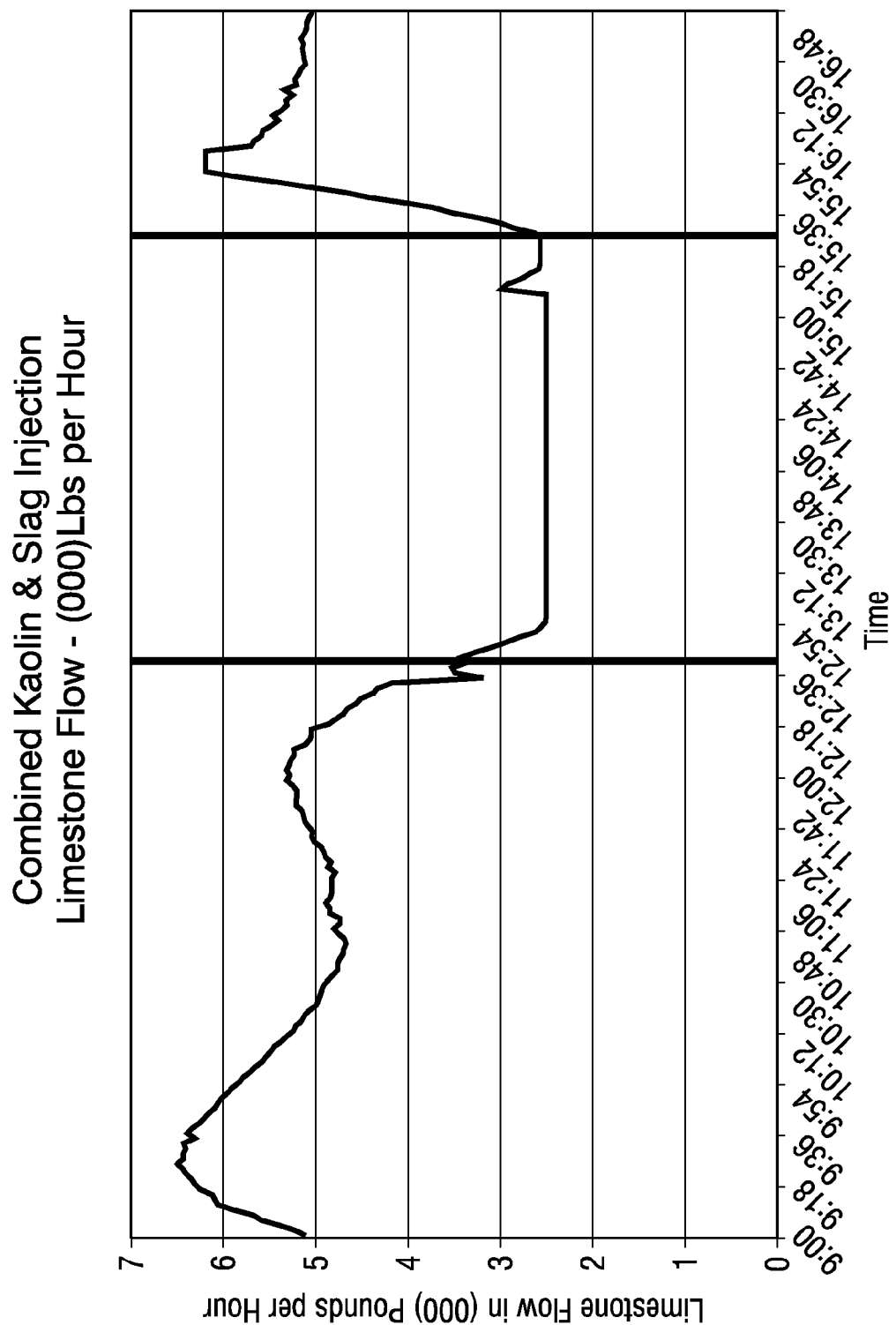
FIG. 9 is a graph of limestone flow versus time during the combined injection of kaolin, slag and limestone into a coal combustion process in accordance with an embodiment of the present invention.

FIG. 9 is a graph of limestone flow versus time during the combined injection of kaolin and slag into the coal combustion zone. FIG. 9 illustrates limestone flow during the combined injection of kaolin and slag, as well as limestone flow before and after the kaolin and slag injections. During the periods before and after the injection, limestone flow averaged about 5,000 pounds per hour, while during the injection period limestone flow was reduced to about 2,500 pounds per hour. The reduced limestone flow resulted from an automatic limestone injection system in which $SO_X$ emissions were measured and the amount of limestone was adjusted to maintain the $SO_X$ emissions at a substantially constant level, e.g., the system reduced limestone injections when the $SO_X$ emissions were lowered.

Similar tests to those described above were run in the coal fired boiler, but the slag was not injected in one comparative test, and the kaolin was not injected in the other comparative test. The results are shown in FIGS. 10 and 11, and in FIG. 12, respectively.

Figure 10:
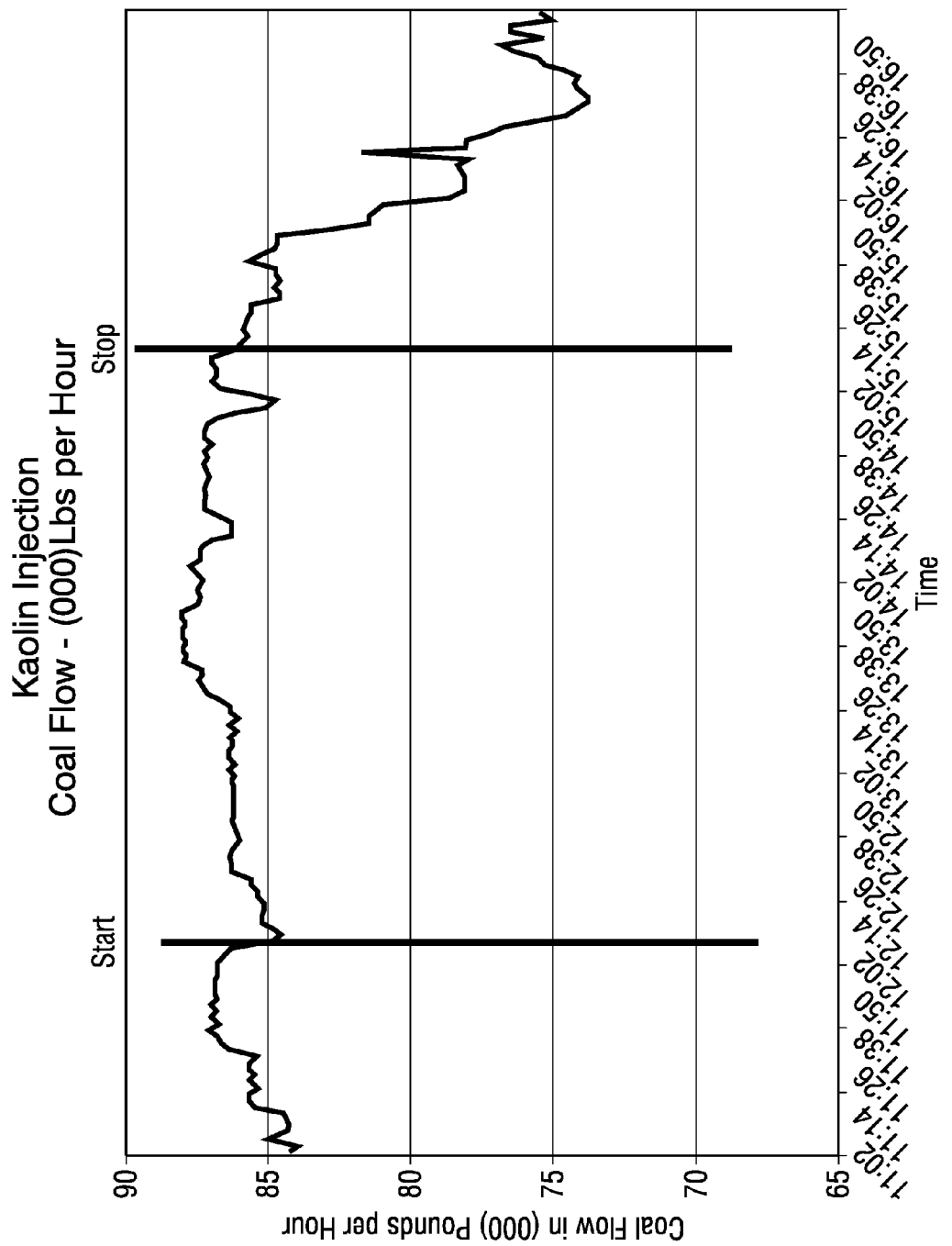
FIG. 10 is a graph of coal flow versus time during a coal combustion process in which kaolin is injected during a portion of the coal combustion process in accordance with an embodiment of the present invention.
Figure 11:
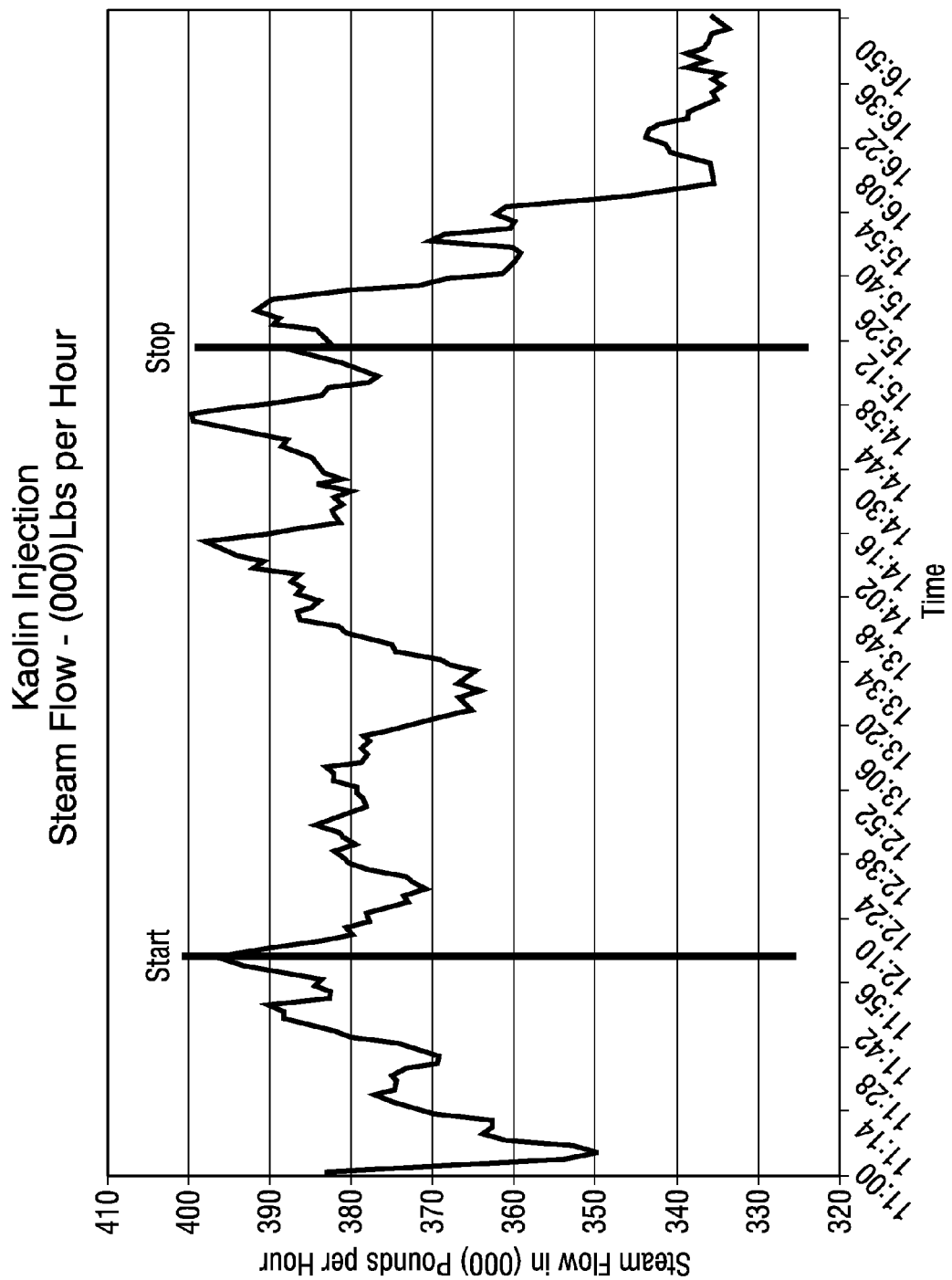
FIG. 11 is a graph of steam flow versus time during a coal combustion process in which kaolin is injected during a portion of the coal combustion process in accordance with an embodiment of the present invention.

FIG. 10 is a graph of coal flow versus time during the coal combustion process in which kaolin, but not slag, is injected during a portion of the coal combustion process. FIG. 11 is a graph of steam flow versus time during the coal combustion process in which kaolin, but not slag, is injected during a portion of the coal combustion process. As shown in FIG. 10, coal flow was maintained at a substantially constant rate before, during, and for a period of time after the period in which the kaolin was injected. FIG. 11 tracks the boiler steam flow. Although not shown in FIGS. 10 and 11, the injection of kaolin, as opposed to the combined injection of kaolin and slag, results in lower flue gas outlet temperatures.

Figure 12:
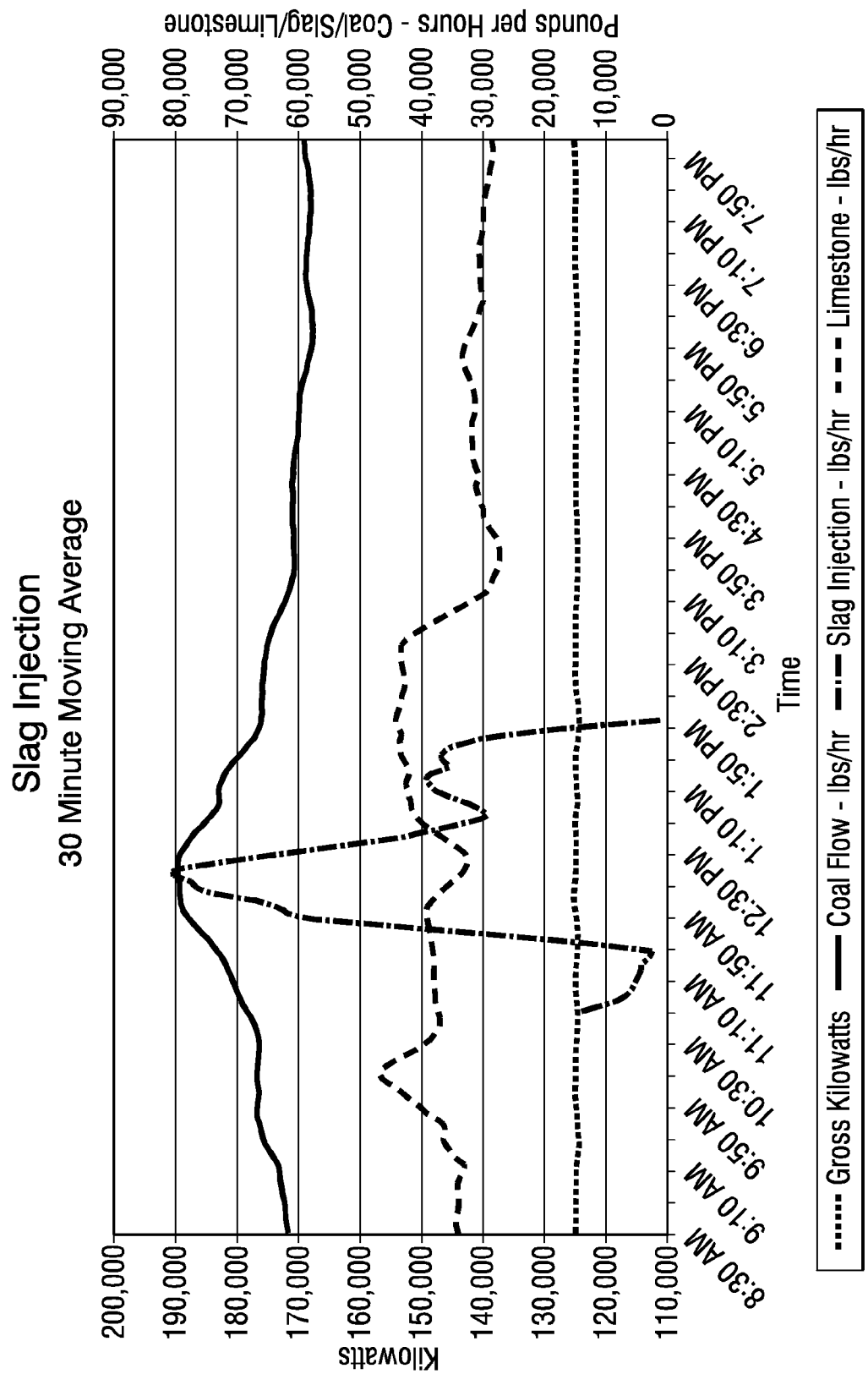
FIG. 12 is a graph of coal, slag and limestone flow and electric power generation versus time during a coal combustion process for comparison purposes.

FIG. 12 is a graph of coal, slag and limestone flow and electric power generation versus time during the coal combustion process in which slag, but not kaolin, was injected. As shown in FIG. 12, during the period of slag injection, power output (in kilowatts) was maintained at a constant level, but coal flow was increased.

The test results indicate that combined injections of kaolin and slag together provide improvements such as greater output for the same amount of coal (e.g., greater steam output from the boiler and greater electric power output from the power generation plant) and increased boiler efficiency (e.g., decreased carbon monoxide production). In addition, heavy metal emissions may be reduced or eliminated and limestone injections may be reduced or eliminated while maintaining $SO_x$ emission levels below target levels.

Tables 1 and 2 show compressive strengths for base Portland cement (Sample No. 1), base Portland cement with various substitutions of unmodified flyash from a conventional coal-fired power plant (Sample Nos. 2 and 3), and Portland base cement with various substitutions of the combined coal/clay/slag combustion products of the present invention produced in-situ in a fluidized bed coal fired boiler, as described above (Sample Nos. 4-7). As shown in Table 1, the combustion products of the present invention exhibit favorable 7-day and 28-day compressive strengths.

TABLE 1

Mortar Cube Compression Strength Data (per ASTM C109)

| Sample No. | Comments | 7 day Compressive Strength (psi) | 28 day Compressive Strength (psi) | % Portland |
|---|---|---|---|---|
| 1 | Base Portland cement | 6321 | 8227 | 100 |
| 2 | Base cement with unmodified flyash (20% substitution) | 3874 | 7277 | 88 |
| 3 | Base cement with unmodified flyash (30% substitution) | 3504 | 7339 | 89 |
| 4 | Co-Combustion Product (20% substitution) | 6613 | 9257 | 112 |
| 5 | Co-Combustion Product (30% substitution) | 6383 | 8697 | 105 |
| 6 | Co-Combustion Product (40% substitution) | 4868 | 6734 | 81 |
| 7 | Co-Combustion Product (50% substitution) | 3988 | 6026 | 73 |

Equivalent Sample Nos. 1 and 5 were subjected to additional compression strength tests, with the results shown in Table 2.

TABLE 2

Concrete Cylinder Compression Strength Data

| Sample No. | Comments | 7 day Compressive Strength (psi) | 28 day Compressive Strength (psi) |
|---|---|---|---|
| 1 | Base Portland cement | 8537 | 10155 |
| 5 | Co-Combustion Product (30% substitution) | 8382 | 9494 |

Additional compressive strength tests were performed using a coal combustion product of the present invention produced at another electrical power generation plant using a coal fired burner using low-grade coal. Table 3 lists the compressive strengths for base Portland cement (Sample No. 8), base Portland cement with conventional fly ash at different loadings (Sample Nos. 9 and 10), and Portland base cement with different loadings of the combined coal/kaolin/slag combustion product produced in the coal-fired boiler (Sample Nos. 11 and 12).

TABLE 3

| Sample No. | Comments | 7 day Compressive Strength (psi) | 28 day Compressive Strength (psi) | % Portland |
|---|---|---|---|---|
| 8 | Base Portland cement | 6021 | 8227 | 100 |
| 9 | Base cement with unmodified flyash (20% substitution) | 4898 | 7204 | 87 |
| 10 | Base cement with unmodified flyash (30% substitution) | 4465 | 6100 | 74 |
| 11 | Co-Combustion Product (20% substitution) | 5680 | 7815 | 95 |
| 12 | Co-Combustion Product (30% substitution) | 5349 | 6746 | 82 |

Table 4 provides mercury capture test results. Test Material A comprised coal with limestone injections. Test Material B comprised coal with clay injections. Test Material C comprised coal with combined slag and clay injections in which the clay was present in a relatively small amount. Test Material D comprised coal with slag and clay injections in which the clay was present in a relatively large amount. Injections were made as a liquid slurry into a hot zone prior to the bag house. The combined slag and clay injections significantly reduced mercury levels. Mercury levels were reduced by 40% or more.

TABLE 4

Combustion Fluidized Bed Injection Testing

| Mercury Testing | | Allowable Limit | | | | | | % | |
|---|---|---|---|---|---|---|---|---|---|
| Day No. | Material | lbs/ GWh | lbs/ TBtu | lbs/ MMBtu | lbs/ TBtu | lbs/ GWh | % of Allowable | Annual Average |
| 1 | Test Material A | 0.013 | 0.12 | 3.27E−08 | 3.27E−02 | 4.39E−04 | 2.73% | 27.25% |
| 2 | Test Material B | | | 3.10E−08 | 3.10E−02 | 4.02E−04 | 2.58% | 25.83% |
| 3 | Test Material C | | | 1.36E−08 | 1.36E−02 | 1.78E−04 | 1.13% | 11.33% |
| 4 | Test Material D | | | 2.12E−08 | 2.12E−02 | 2.80E−04 | 1.77% | 17.67% |

Note:
Hg average emissions less than 10% of 1.2 lbs/TBtu or potential of less than 29 lbs/year Whereas particular embodiments of this invention have been described above for purposes of illustration, it will be evident to those skilled in the art that numerous variations of the details of the present invention may be made without departing from the invention as defined in the appended claims.

What is claimed is:

1. A cementitious material comprising:
   cement; and
   a pozzolanic cement additive comprising coal combusted in the presence of a clay additive and a slag additive, wherein the combined weight of the clay additive and the slag additive is at least 8 weight percent of the weight of the coal.

2. The cementitious material of claim 1, wherein the clay additive comprises at least one member of a kaolin group, smectite group, illite group or chlorite group.

3. The cementitious material of claim 1, wherein the clay additive comprises kaolin.

4. The cementitious material of claim 1, wherein the clay additive comprises from 2 to 30 weight percent of the coal.

5. The cementitious material of claim 1, wherein the slag additive comprises ferrous slag.

6. The cementitious material of claim 1, wherein the slag additive comprises stainless steel slag.

7. The cementitious material of claim 1, wherein the slag additive comprises from 2 to 30 weight percent of the coal.

8. The cementitious material of claim 1, wherein a combined weight of the clay additive and the slag additive is from 8 to 60 weight percent of the coal.

9. The cementitious material of claim 1, wherein a combined weight of the clay additive and the slag additive is from 10 to 40 weight percent of the coal.

10. The cementitious material of claim 1, wherein the pozzolanic cement additive further comprises limestone combusted in the presence of the coal, clay additive and slag additive.

11. The cementitious material of claim 10, wherein the limestone comprises up to 5 weight percent of the coal.

12. The cementitious material of claim 10, wherein the limestone comprises from 0.5 to 3 weight percent of the coal.

13. The cementitious material of claim 1, wherein the cement additive comprises greater than 25 weight percent of the cementitious material.

14. The cementitious material of claim 1, wherein the cement comprises Portland cement.

15. A pozzolanic strength enhancing material for addition to cement comprising a combustion product of coal combusted in the presence of a clay additive and a slag additive, wherein the combined weight of the clay additive and the slag additive is at least 8 weight percent of the weight of the coal.

16. A method of making a pozzolanic cement additive material comprising combusting coal in the presence of a clay additive and a slag additive to thereby produce the pozzolanic cement additive material, wherein the combined weight of the clay additive and the slag additive is at least 8 weight percent of the weight of the coal.

17. The method of claim 16, wherein the clay additive comprises kaolin and the slag additive comprises ferrous slag.

18. The method of claim 17, wherein each of the kaolin and stainless steel slag comprise from 2 to 30 weight percent of the coal.

19. The method of claim 16, comprising combusting the coal in the presence of limestone in addition to the clay additive and the slag additive.

20. The method of claim 19, wherein the limestone comprises from 0.5 to 3 weight percent of the coal.

* * * * *